US011018781B2

(12) United States Patent
Scheck (10) Patent No.: US 11,018,781 B2
(45) Date of Patent: May 25, 2021

(54) BASE STATION EFFICIENCY CONTROL BASED ON LOAD COUNTERS (71) Applicant: Nokia Solutions and Networks Oy, Espoo (FI)

(72) Inventor: Hans-Otto Scheck, Vaxholm (SE)

(73) Assignee: Nokia Solutions and Networks Oy, Espoo (FI)

( * ) Notice: Subject to any disclaimer, the term of this patent is extended or adjusted under 35 U.S.C. 154(b) by 29 days.

(21) Appl. No.: 16/482,291

(22) PCT Filed: Jan. 31, 2017

(86) PCT No.: PCT/EP2017/051966
§ 371 (c)(1),
(2) Date: Jul. 31, 2019

(87) PCT Pub. No.: WO2018/141351
PCT Pub. Date: Aug. 9, 2018

(65) Prior Publication Data
US 2019/0349099 A1 Nov. 14, 2019

(51) Int. Cl.
H04B 17/17 (2015.01)
H04B 17/24 (2015.01)
(Continued)

(52) U.S. Cl.
CPC ............. *H04B 17/17* (2015.01); *H04B 17/24* (2015.01); *H04L 43/0882* (2013.01);
(Continued)

(58) Field of Classification Search
CPC ..... H04B 17/17; H04B 17/24; H04L 43/0882; H04L 43/0894; H04W 24/04;
(Continued)

(56) References Cited

U.S. PATENT DOCUMENTS 5,459,665 A * 10/1995 Hikita .................. G08G 1/07
701/118
6,529,572 B1 * 3/2003 Rasanen ............... H04J 3/0638
375/354

(Continued)

OTHER PUBLICATIONS

"3rd Generation Partnership Project; Technical Specification Group Services and System Aspects; Telecommunication management; Performance Management (PM); Performance measurements Evolved Universal Terrestrial Radio Access Network (E-UTRAN) (Release 14)", 3GPP TS 32.425, V14.1.0, Dec. 2016, pp. 1-82.

(Continued)

*Primary Examiner* — Kashif Siddiqui
(74) *Attorney, Agent, or Firm* — Nokia Technologies Oy (57) ABSTRACT It is provided a method, comprising determining, for plural data pairs each comprising a respective one of a downlink traffic volume of a cell and a downlink traffic bitrate of the cell and a related downlink utilization of the cell, a correlation between the one of the downlink traffic volumes and the downlink traffic bitrates and the downlink utilizations; checking if the correlation is smaller than a predetermined correlation threshold; deciding that the cell is a problematic cell if the correlation is smaller than the correlation threshold.

15 Claims, 4 Drawing Sheets (51) Int. Cl.
H04L 12/26 (2006.01)
H04W 24/04 (2009.01)
H04W 24/10 (2009.01)

(52) U.S. Cl.
CPC ......... *H04L 43/0894* (2013.01); *H04W 24/04* (2013.01); *H04W 24/10* (2013.01)

(58) Field of Classification Search
CPC .. H04W 24/10; H04W 52/0206; Y02D 70/00; Y02D 70/1242; Y02D 70/1262; Y02D 70/1264
See application file for complete search history.

(56) References Cited

U.S. PATENT DOCUMENTS

| | | | | |
|---|---|---|---|---|
| 8,406,131 | B2* | 3/2013 | Kotrla | H04L 41/5009 370/230.1 |
| 9,386,563 | B1* | 7/2016 | Oroskar | H04W 72/0406 |
| 2013/0345955 | A1* | 12/2013 | Tashiro | G08G 1/00 701/118 |
| 2015/0103648 | A1* | 4/2015 | Chou | H04B 7/024 370/230 |
| 2017/0142144 | A1* | 5/2017 | Weinberger | H04L 63/0236 |

OTHER PUBLICATIONS

"3rd Generation Partnership Project; Technical Specification Group Radio Access Network; Evolved Universal Terrestrial Radio Access (E-UTRA); Layer 2—Measurements (Release 13)", 3GPP TS 36.314 V13.1.0, Mar. 2016, pp. 1-23.

"Environmental Engineering (EE); Metrics and measurement method for energy efficiency of wireless access network equipment; Part 1: Power Consumption—Static Measurement Method", ETSI ES 202 706-1 V1.5.1, Jan. 2017, pp. 1-49.

International Search Report and Written Opinion received for corresponding Patent Cooperation Treaty Application No. PCT/EP2017/051966, dated Oct. 9, 2017, 8 pages.

Office Action received for corresponding European Patent Application No. 17702361.1, dated Aug. 25, 2020, 4 pages.

* cited by examiner

BASE STATION EFFICIENCY CONTROL BASED ON LOAD COUNTERS

RELATED APPLICATION

This application was originally filed as Patent Cooperation Treaty Application No. PCT/EP2017/051966 filed Jan. 31, 2017.

FIELD OF THE INVENTION

The present invention relates to an apparatus, a method, and a computer program product related to base station efficiency control. More particularly, the present invention relates to an apparatus, a method, and a computer program product of base station efficiency control based on load counters.

ABBREVIATIONS

3GPP Third Generation Partnership Project
4G 4th Generation
5G 5th Generation
BS Base Station
CDMA Code Division Multiple Access
DL Downlink
DTCH Dedicated traffic channel
EDGE Enhanced Datarate for GSM Evolution
ES ETSI Specification
ETSI European Telecommunications Standards Institute
LTE Long Term Evolution
LTE-A LTE-Advanced
NMC Network Management Center
OMC Operation and Maintenance Center
PA Power Amplifier
PDCP Packet Data Convergence Protocol
PRB Physical Resource Block
QoS Quality of Service
RF Radio Frequency
SDU Service Data Unit
TS Technical Specification
UMTS Universal Mobile Telecommunications System
UTRAN UMTS Terrestrial Radio Access Network

BACKGROUND OF THE INVENTION

Cellular base stations are dimensioned according to network planning and estimated load scenarios. BS capacity is determined by two main factors: data capacity (ability to process a certain amount of data during a given time period) and RF power (capability to deliver the data over the requested distance). Data capacity is largely determined by the capacity of the system modules (e.g. decoder, encoder, modulator, demodulator, baseband mixer, etc.), while the actual area coverage is determined by the maximum RF output power setting of the radio module(s) (e.g. power amplifier). To minimize BS power consumption and to optimize efficiency, processing capacity and RF power should be provided according to the specific local requirements. The RF module should be configured to operate with the minimum peak RF power capability which, at the same time, has to be sufficient to guarantee the required coverage under high load conditions.

BS capacity and RF power of a cell are deployed based on network planning. Equipment is dimensioned based on the estimated traffic and cell size. BS energy consumption optimization during operation is typically done only upon special customer request.

Some operators install power meters to monitor base station power consumption and compare it with the actual traffic load (data rate) to monitor BS efficiency to obtain an efficiency indicator. However, such a measure can be misleading because such an efficiency indicator does not take the specific requirements and conditions of different cells into account.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform at least determining, for plural data pairs each comprising a respective one of a downlink traffic volume of a cell and a downlink traffic bitrate of the cell and a related downlink utilization of the cell, a correlation between the one of the downlink traffic volumes and the downlink traffic bitrates and the downlink utilizations; checking if the correlation is smaller than a predetermined correlation threshold; deciding that the cell is a problematic cell if the correlation is smaller than the correlation threshold.

The apparatus may perform the determining, checking, and deciding independently for respective plural data pairs of plural cells; and the at least one processor, with the at least one memory and the computer program code, may be arranged to cause the apparatus to further perform checking if a proportion of a number of the problematic cells to a total number of the cells is smaller than a proportion threshold; and, if the proportion is smaller than the proportion threshold, at least one of performing a modification of respective radio configurations of each of the problematic cells; and providing a problem information about each of the problematic cells informing that the respective cell is problematic.

The at least one memory and the computer program code may be arranged to cause the apparatus to further perform inhibiting the respective at least one of the performing the modification and the providing of the problem information if the proportion is not smaller than the proportion threshold.

The at least one memory and the computer program code may be arranged to cause the apparatus to further perform determining a first proportion of the data pairs having a utilization being less than a predetermined underutilization threshold; deciding that the cell is underutilized if the first proportion is larger than a predetermined first proportion threshold and the correlation is larger than the predetermined correlation threshold.

The at least one memory and the computer program code may be arranged to cause the apparatus to further perform, if the first proportion is larger than the first proportion threshold and the correlation is larger than the predetermined correlation threshold, at least one of reducing a radio transmit power of the cell; and providing an underutilization information about the cell informing that the cell is underutilized.

The at least one memory and the computer program code may be arranged to cause the apparatus to further perform determining a second proportion of the data pairs having a utilization being larger than a predetermined overutilization threshold; deciding that the cell is overutilized if the second proportion is larger than a predetermined second proportion threshold and the correlation is larger than the predetermined correlation threshold.

The at least one memory and the computer program code may be arranged to cause the apparatus to further perform, if the second proportion is larger than the second proportion threshold and the correlation is larger than the predetermined correlation threshold, at least one of increasing a radio transmit power of the cell; and providing an overutilization information about the cell informing that the cell is overutilized.

The at least one memory and the computer program code may be arranged to cause the apparatus to further perform, if the first proportion is not larger than the first proportion threshold and the second proportion is not larger than the second proportion threshold and the correlation is larger than the predetermined correlation threshold, inhibiting the at least one of the reducing the radio transmit power of the cell and the providing of the underutilization information and inhibiting the at least one of the increasing the radio transmit power of the cell and the providing of the overutilization information; and wherein the underutilization threshold is smaller than the overutilization threshold.

According to a second aspect of the invention, there is provided a method, comprising determining, for plural data pairs each comprising a respective one of a downlink traffic volume of a cell and a downlink traffic bitrate of the cell and a related downlink utilization of the cell, a correlation between the one of the downlink traffic volumes and the downlink traffic bitrates and the downlink utilizations; checking if the correlation is smaller than a predetermined correlation threshold; deciding that the cell is a problematic cell if the correlation is smaller than the correlation threshold.

The determining, checking, and deciding may be performed independently for respective plural data pairs of plural cells; and the method may further comprise checking if a proportion of a number of the problematic cells to a total number of the cells is smaller than a proportion threshold; and, if the proportion is smaller than the proportion threshold, at least one of performing a modification of respective radio configurations of each of the problematic cells; and providing a problem information about each of the problematic cells informing that the respective cell is problematic.

The method may further comprise inhibiting the respective at least one of the performing the modification and the providing of the problem information if the proportion is not smaller than the proportion threshold.

The method may further comprise determining a first proportion of the data pairs having a utilization being less than a predetermined underutilization threshold; deciding that the cell is underutilized if the first proportion is larger than a predetermined first proportion threshold and the correlation is larger than the predetermined correlation threshold.

The method may further comprise, if the first proportion is larger than the first proportion threshold and the correlation is larger than the predetermined correlation threshold, at least one of reducing a radio transmit power of the cell; and providing an underutilization information about the cell informing that the cell is underutilized.

The method may further comprise determining a second proportion of the data pairs having a utilization being larger than a predetermined overutilization threshold; deciding that the cell is overutilized if the second proportion is larger than a predetermined second proportion threshold and the correlation is larger than the predetermined correlation threshold.

The method may further comprise, if the second proportion is larger than the second proportion threshold and the correlation is larger than the predetermined correlation threshold, at least one of increasing a radio transmit power of the cell; and providing an overutilization information about the cell informing that the cell is overutilized.

The method may further comprise, if the first proportion is not larger than the first proportion threshold and the second proportion is not larger than the second proportion threshold and the correlation is larger than the predetermined correlation threshold, inhibiting the at least one of the reducing the radio transmit power of the cell and the providing of the underutilization information and inhibiting the at least one of the increasing the radio transmit power of the cell and the providing of the overutilization information; and wherein the underutilization threshold is smaller than the overutilization threshold.

The method of the second aspect may be a method of base station efficiency control.

According to a third aspect of the invention, there is provided a computer program product comprising a set of instructions which, when executed on an apparatus, is configured to cause the apparatus to carry out the method according to the second aspect. The computer program product may be embodied as a computer readable medium or directly loadable into a computer.

According to some embodiments of the invention, at least one of the following advantages may be achieved:
Base station efficiency may be improved;
Energy consumption of the network may be reduced;
Additional onsite equipment (e.g. power meter) is not required;
Communication interfaces need not to be modified.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of the invention improve the configuration of BS capacity and RF transmit power in a cell to optimize base station efficiency and/or minimize network energy consumption. That is, some embodiments of the invention provide a procedure to analyse and optimize BS efficiency during operation. By utilizing different BS performance counters RF power settings may be optimized automatically and the need for additional cells in specific areas will be indicated. Thus, additional on-site equipment such as power meters is not needed, and the procedure may be applied on data which are anyway generated by the base station and transmitted to a management center (optimization center), such as OMC or NMC.

DL PRB utilisation and SDU volume are two parameters commonly used to monitor BS performance. DL PRB utilisation is an accurate indicator for base station power consumption. Field test have shown that BS power consumption (measured according to ES 202 706) can accurately predict average BS power consumption in the field based on load measurements (parameter: DL_PRB_UTIL_TTI). DL_PRB_UTIL_TTI is an example of a downlink utilization of the cell.

Figure 1:
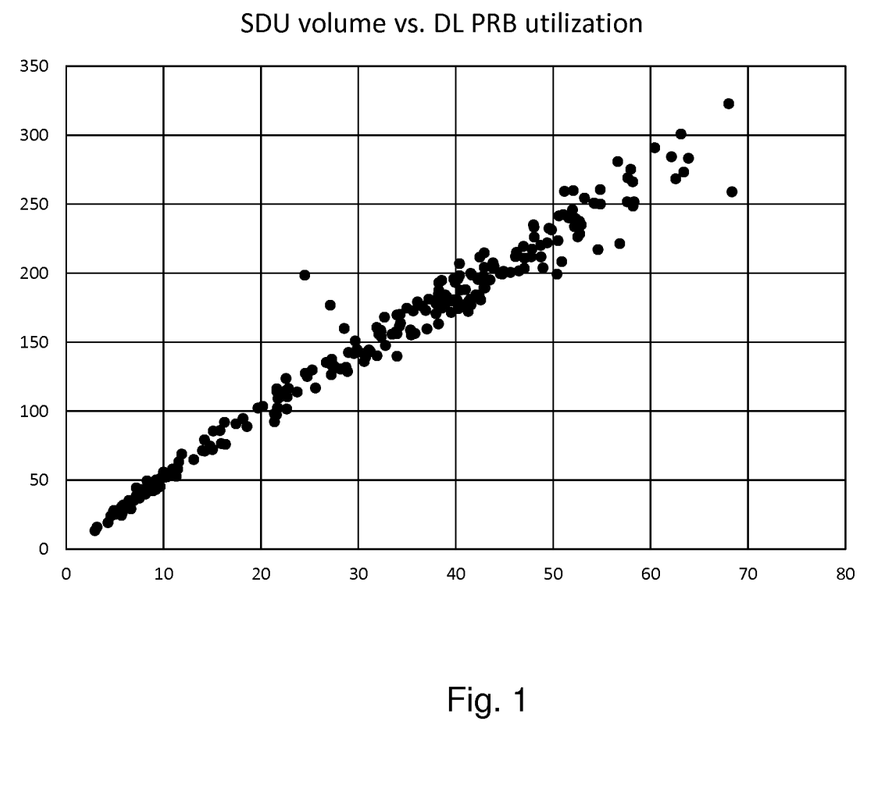
FIG. 1 shows a scatter diagram for a well utilized cell.
Figure 2:
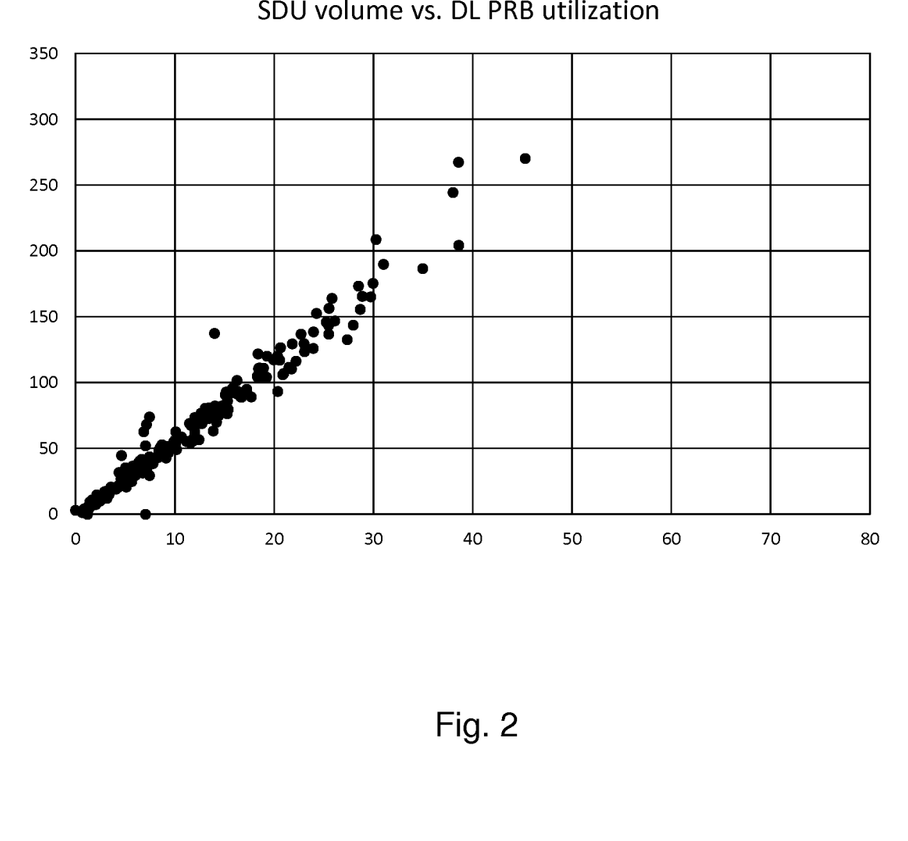
FIG. 2 shows a scatter diagram for an underutilized cell.
Figure 3:
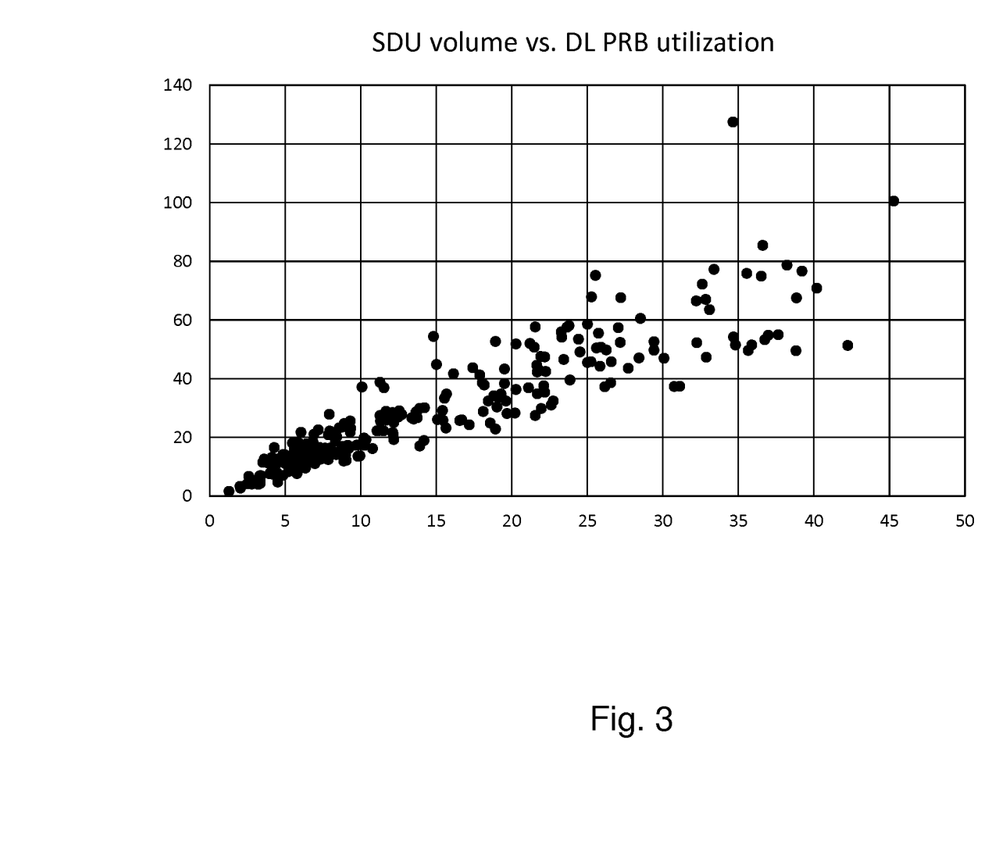
FIG. 3 shows a scatter diagram for a potentially problematic cell.

Graphically, the procedure used according to some embodiments of the invention may be based on the characteristics of a scatter diagram showing the SDU volume vs. DL PRB utilization recorded over an extended period of time (a minimum of one week is recommended). FIGS. 1 to 3 show example scatter diagrams. Each data point corresponds to a data pair of an SDU volume (abscissa) processed by the cell over a certain measurement period and a DL PRB utilization (ordinate) of the same cell in the same measurement period. A measurement period may be e.g. 5 minutes, 15 minutes, or 60 minutes but is not limited to these values. Plural data points in each scatter diagram correspond to different measurement periods on the same cell. The total measurement period (all data pairs used for evaluation and decision making) may be e.g. 1 day or 1 week but is not limited to these values. Preferably, the measurement periods used for a scatter diagram cover the whole extended period of time and do not overlap. E.g., if the extended period of time is 1 week and the measurement period is 15 minutes, the number of data points is preferably 7*24*4=672. However, the method according to some embodiments of the invention may be applied even if some data points of the extended period are missing and/or some measurement periods overlap.

The characteristics of the scatter diagram may be distinguished as follows:

A) Well utilized cell:

The scatter points are located close to a straight line (i.e. well correlated). The scatter points may be relatively equally distributed along the line. However, they reach regularly (i.e., at least with a minimum frequency of occurrence) >50% of utilization. An example scatter diagram for a well utilized cell is shown in FIG. 1.

Result: No action needed

B) Underutilised cell:

The scatter points are located close to a straight line (i.e. well correlated). The scatter points may be relatively equally distributed along the line. However, the utilization reaches regularly (i.e., at least with a minimum frequency of occurrence) less than 50% utilization. An example scatter diagram for an underutilized cell is shown in FIG. 2.

Result: Cell reconfiguration recommended. In some embodiments, the cell is automatically reconfigured. That is, the RF capacity (peak transmit power) is reduced in order to reach a higher utilisation and hence better power amplifier efficiency. E.g., the PA peak power setting may be reduced by one level.

C) Overutilised cell:

The scatter points are located close to a straight line (i.e. well correlated). The scatter points may be relatively equally distributed along the line. However, utilization reaches regularly (i.e., at least with a minimum frequency of occurrence) >90% utilization.

Result: Cell reconfiguration recommended. The RF capacity (peak transmit power) of the cell reaches its capacity limits. In some embodiments, the cell is automatically reconfigured. That is, RF capacity (PA peak power setting) is increased to guarantee QoS during peak load conditions. E.g., the PA peak power setting may be increased by one level.

D) Potentially problematic cell:

The scatter points are deviating significantly from a straight line (i.e. poorly correlated).

This indicates a significant problem with the cell. SDU volume and DL PRB utilisation are only slightly correlated. The delivered data volume is often lower than what could be expected from the power consumption. The cell is operating in an inefficient way. An example of a potentially problematic cell is shown in FIG. 3.

In order to decide if the cell is problematic (and should be reconfigured), or if other reasons cause the poor correlation of SDU volume and DL PRB utilisation, the scatter diagram of the cell may be compared with scatter diagrams of other cells which may be independently obtained for each of the cells.

If many cells show such a behaviour (poor correlation) it might be caused by specific UE models or specific applications requiring a significant overhead of signalling. In this case, a further analysis based on other parameters (like number of connected users, RF-Connection setup utilization, etc.) may be carried out to understand the reason for the poor correlation.

If such a behaviour is detected in specific cells only (e.g. in cells of a specific type or configuration only, or in a rather small proportion of the total number of considered cells), the poor correlation may indicate a site specific coverage problem (e.g. unpredictable and rapidly changing path loss). For example, the cell might cover a mix of residential area and a heavily trafficked road, or a residential area with many in-building users. A modification of the antenna pattern or the addition of small cells should be considered to improve BS utilisation, network efficiency and customer satisfaction (QoS).

The above mentioned thresholds for the utilization (50% in cases A and B; 90% in case C) are example utilization thresholds only. Each of them may be different from the respective above value. Also, the threshold for cases A and B may be different from each other. Preferably, the threshold for case C is larger than that for case A. Preferably, the threshold for case A is equal to or larger than the threshold for case B. The utilization thresholds are predetermined.

Also, the minimum frequency of occurrence may have a predetermined arbitrary value for each of the three cases A, B, C. The values of any two of the minimum frequencies of occurrence may be the same or different from each other. Example values for minimum frequencies of occurrence are 50%, 70%, and 90% for cases A and C, and 80%, 90%, and 95% for case B.

In order to decide whether or not SDU volume and DL PRB utilization are well correlated, statistical analysis may be used. For example, the correlation coefficient obtained by dividing the covariance of the two variables SDU volume and DL PRB utilization by the product of their standard deviations may be used. If the correlation coefficient is larger than a predetermined correlation threshold value, SDU volume and DL PRB utilization are well correlated, otherwise not. Example correlation threshold values are 0.7, 0.8, and 0.9.

Other example statistical parameters to be evaluated in order to determine whether or not SDU volume and DL PRB utilization are well correlated are the variance of the ratio (quotient) of SDU volume and DL PRB utilization, distance correlation, a Randomized Dependence Coefficient and a correlation ratio. In some embodiments, plural of these (or other) correlation parameters are determined and a decision whether or not SDU volume and DL PRB utilization are well correlated depends on a logical operation on these correlation parameters. E.g., a good (high) correlation is assumed only if each of these correlation parameters alone indicates that SDU volume and DL PRB utilization are well correlated.

DL PRB utilization and PDCP SDU DL Volume are standard reporting parameters and can be obtained from the radio network management system (NMC or OMC). The actual parameter name and measurement format might be vendor specific, but the principal information is available from the network management center for bases stations from all vendors.

The DL PRB utilization measurement provides the usage (in percentage) of physical resource blocks (PRBs) on the downlink for DTCH traffic as defined in 3GPP TS 32.425 and TS 36.314.

The PDCP SDU parameters are cell level radio bearer related measurements. The PDCP SDU volume is defined in 3GPP TS 36.314 as: Data Volume for MDT in DL. Amount of PDCP SDU bits in downlink delivered from PDCP layer to RLC layer in a measurement period. The measurement is performed per QCI per UE. The unit may be kbit.

3GPP TS 32.425 describes the measurement of the PDCP SDU bit-rate. Some embodiments of the invention apply the PDCP SDU bit-rate instead of or in addition to the SDU volume.

In some embodiments, one or both of these parameters may be normalized, e.g. by an assumed or measured maximum DL PRB utilization and maximum PDCP SDU DL volume.

In some embodiments of the invention, an algorithm is implemented to analyse these data according to at least one of the cases A to D outlined hereinabove. An example algorithm may cover three steps:
1. Analyse the DL volume vs. DL PRB utilisation ratio (i.e.: are DL volume vs. DL PRB utilisation are well correlated)
2. Analyse the PRB utilisation (i.e., is its value frequently larger/smaller than a predetermined utilization threshold)
3. If needed, one or both of automatic correction is performed and information on need for correction is provided. The information may comprise a proposal for action based on above analysis results and predefined parameters as following:

Steps 1 and 2 may be performed one after the other in an arbitrary order or fully or partly in parallel. In some embodiments, step 2 may be performed only if, according to step 1, DL volume vs. DL PRB utilisation are well correlated.

If automatic correction is performed, the algorithm may or may not inform on the automatic correction. For example, if the algorithm does not inform on the automatic correction, such information may be provided by the cell on which the automatic correction was (successfully) performed.

In some embodiments, the algorithm may not even inform on the need for correction or a performed automatic correction. In such embodiments, the operator may have to retrieve this information from the system where the information is stored.

In the algorithm, the PRB utilisation ratio parameter may be set as the shown in the following example but other values might be selected:
  If the PRB utilisation is <40% for 90 . . . 95% of the time the maximum RF power configuration of the cell is too high. Reducing RF power configuration will increase PA efficiency and decrease average power consumption with minimal loss of QoS.
  If the PRB utilisation is >70% for 90 . . . 95% of the time RF power provisioning of the cell is too low. Customers will experience a loss of QoS and a power upgrade (increase) of the cell is recommended.

In some example embodiments, the variance of the ratio SDU volume vs. PRB utilisation may be defined as the correlation parameter:
  If the variance of the ratio SDU volume vs. PRB utilisation is larger than a predefined variance threshold the network management system in the example may perform at least one of the following actions:
    Display an alarm (or another type of message) indicating the need for further cell investigation.
    Starts an analysis of the RF-Connection setup utilization parameter in neighbouring cells to identify if the problem is caused by unusual user behaviour (behaviour appears in many cells) or is a cells specific problem.
    Starts an RF link budget analysis. A rapid and unpredictable change of the RF link budget indicates a problem with the cell coverage: It could be caused by too large cell size, large amount of indoor users, and/or a defect antenna system.

Figure 4:
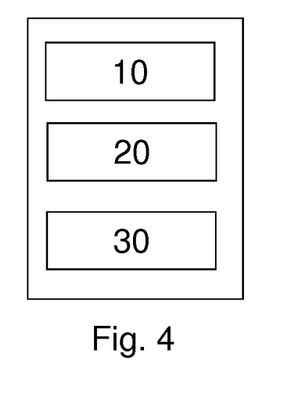
FIG. 4 shows an apparatus according to an embodiment of the invention.
Figure 5:
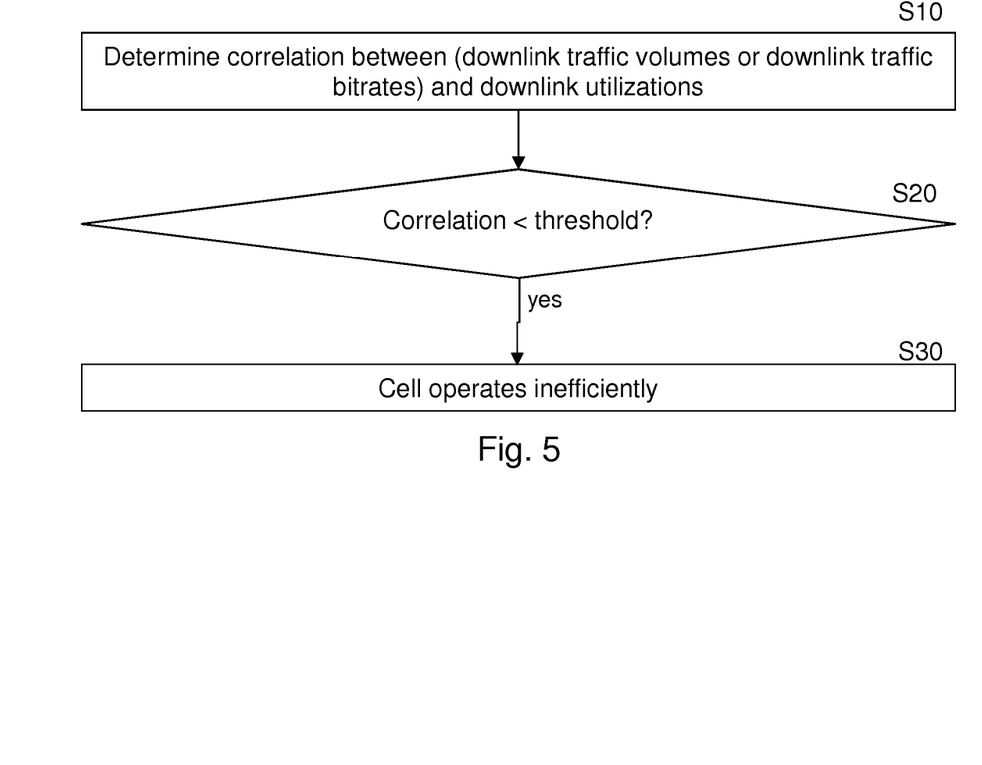
FIG. 5 shows a method according to an embodiment of the invention.

FIG. 4 shows an apparatus according to an embodiment of the invention. The apparatus may be a management system such as a OMC or NMC, or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises determining means 10, checking means 20, and deciding means 30. The determining means 10, checking means 20, and deciding means 30 may be determining processor, checking processor, and deciding processor, respectively. The apparatuses may additionally comprise a reconfiguration means (such as a reconfiguration processor) to automatically reconfigure the cell if it is decided that the cell operates inefficiently (e.g. if the cell is underutilized or overutilized; see cases B and C hereinabove) or is a (potentially) problematic cell (see case D hereinabove).

The determining means 10 determines, for plural data pairs a correlation between downlink traffic volumes and downlink utilizations (S10). Each data pair comprises a respective downlink traffic volume of a cell and a related downlink utilization of the cell. The related downlink utilization is preferably obtained for the same measurement period as the downlink volume.

The checking means 20 checks if the correlation between the downlink traffic volumes and the downlink utilizations is smaller than a predetermined correlation threshold (S20).

If the correlation is smaller than the correlation threshold (S20="yes"), the deciding means 30 decides that the cell is a problematic cell (S30). E.g., the cell may be a problematic cell according to case D hereinabove.

In some embodiments, instead of the downlink traffic volumes, downlink traffic bitrates are considered.

Figure 6:
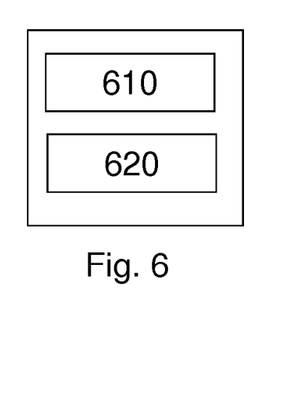
FIG. 6 shows an apparatus according to an embodiment of the invention.

FIG. 6 shows an apparatus according to an embodiment of the invention. The apparatus comprises at least one processor 610, at least one memory 620 including computer program code, and the at least one processor 610, with the at least one memory 620 and the computer program code, being arranged to cause the apparatus to at least perform at least the method according to FIG. 5.

Embodiments of the invention may be employed in a 3GPP network such as LTE or LTE-A, or in a 5G network. They may be employed also in other cellular communication networks such as CDMA, EDGE, UTRAN networks, etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a network optimization center such as a NMC and/or a OMC, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. They may be implemented fully or partly in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising at least one processor, at least one memory including computer program code, and the at least one processor, with the at least one memory and the computer program code, being arranged to cause the apparatus to at least perform at least
   determining, for plural data pairs each comprising a respective one of a downlink traffic volume of a cell and a downlink traffic bitrate of the cell and a related downlink utilization of the cell, a correlation between the one of the downlink traffic volumes and the downlink traffic bitrates and the downlink utilizations;
   checking if the correlation is smaller than a predetermined correlation threshold;
   deciding that the cell is a problematic cell if the correlation is smaller than the correlation threshold.

2. The apparatus according to claim 1, wherein the at least one memory and the computer program code, is arranged to cause the apparatus to further perform the determining, checking, and deciding independently for respective plural data pairs of plural cells;
   checking if a proportion of a number of the problematic cells to a total number of the cells is smaller than a proportion threshold; and,
   if the proportion is smaller than the proportion threshold, at least one of
   performing a modification of respective radio configurations of each of the problematic cells; and
   providing a problem information about each of the problematic cells informing that the respective cell is problematic.

3. The apparatus according to claim 2, wherein the at least one memory and the computer program code, is arranged to cause the apparatus to further perform
   inhibiting the respective at least one of the performing the modification and the providing of the problem information if the proportion is not smaller than the proportion threshold.

4. The apparatus according to claim 1, wherein the at least one memory and the computer program code, is arranged to cause the apparatus to further perform
   determining a first proportion of the data pairs having a utilization being less than a predetermined underutilization threshold;
   deciding that the cell is underutilized if the first proportion is larger than a predetermined first proportion threshold and the correlation is larger than the predetermined correlation threshold.

5. The apparatus according to claim 4, wherein the at least one memory and the computer program code, is arranged to cause the apparatus to further perform,
   if the first proportion is larger than the first proportion threshold and the correlation is larger than the predetermined correlation threshold, at least one of
   reducing a radio transmit power of the cell; and
   providing an underutilization information about the cell informing that the cell is underutilized.

6. The apparatus according to claim 1, wherein the at least one memory and the computer program code, is arranged to cause the apparatus to further perform
   determining a second proportion of the data pairs having a utilization being larger than a predetermined overutilization threshold;
   deciding that the cell is overutilized if the second proportion is larger than a predetermined second proportion threshold and the correlation is larger than the predetermined correlation threshold.

7. The apparatus according to claim 5, wherein the at least one memory and the computer program code, is arranged to cause the apparatus to further perform,
- if a second proportion is larger than the second proportion threshold and the correlation is larger than the predetermined correlation threshold, at least one of
- increasing a radio transmit power of the cell; and
- providing an overutilization information about the cell informing that the cell is overutilized.

8. The apparatus according to claim 7, wherein the at least one memory and the computer program code, is arranged to cause the apparatus to further perform,
- if the first proportion is not larger than the first proportion threshold and the second proportion is not larger than the second proportion threshold and the correlation is larger than the predetermined correlation threshold, inhibiting the at least one of the reducing the radio transmit power of the cell and the providing of the underutilization information and inhibiting the at least one of the increasing the radio transmit power of the cell and the providing of the overutilization information; and wherein
- the underutilization threshold is smaller than the overutilization threshold.

9. Method, comprising
- determining, for plural data pairs each comprising a respective one of a downlink traffic volume of a cell and a downlink traffic bitrate of the cell and a related downlink utilization of the cell, a correlation between the one of the downlink traffic volumes and the downlink traffic bitrates and the downlink utilizations;
- checking if the correlation is smaller than a predetermined correlation threshold;
- deciding that the cell is a problematic cell if the correlation is smaller than the correlation threshold.

10. The method according to claim 9, wherein the determining, checking, and deciding is performed independently for respective plural data pairs of plural cells;
- checking if a proportion of a number of the problematic cells to a total number of the cells is smaller than a proportion threshold; and,
- if the proportion is smaller than the proportion threshold, at least one of
- performing a modification of respective radio configurations of each of the problematic cells; and
- providing a problem information about each of the problematic cells informing that the respective cell is problematic.

11. The method according to claim 10, further comprising
- inhibiting the respective at least one of the performing the modification and the providing of the problem information if the proportion is not smaller than the proportion threshold.

12. The method according to claim 9, further comprising
- determining a first proportion of the data pairs having a utilization being less than a predetermined underutilization threshold;
- deciding that the cell is underutilized if the first proportion is larger than a predetermined first proportion threshold and the correlation is larger than the predetermined correlation threshold.

13. The method according to claim 12, further comprising,
- if the first proportion is larger than the first proportion threshold and the correlation is larger than the predetermined correlation threshold, at least one of
- reducing a radio transmit power of the cell; and
- providing an underutilization information about the cell informing that the cell is underutilized.

14. The method according to claim 9, further comprising
- determining a second proportion of the data pairs having a utilization being larger than a predetermined overutilization threshold;
- deciding that the cell is overutilized if the second proportion is larger than a predetermined second proportion threshold and the correlation is larger than the predetermined correlation threshold.

15. The method according to claim 14, further comprising,
- if the second proportion is larger than the second proportion threshold and the correlation is larger than the predetermined correlation threshold, at least one of
- increasing a radio transmit power of the cell; and
- providing an overutilization information about the cell informing that the cell is overutilized.

* * * * *